United States Patent
Kälin

(10) Patent No.: US 9,263,981 B2
(45) Date of Patent: Feb. 16, 2016

(54) DRIVE DEVICE FOR USE IN A LABORATORY DEVICE

(75) Inventor: Remo Kälin, Jona (CH)

(73) Assignee: TECAN TRADING AG, Mannedorf (CH)

(*) Notice: Subject to any disclaimer, the term of this patent is extended or adjusted under 35 U.S.C. 154(b) by 287 days.

(21) Appl. No.: 13/080,176

(22) Filed: Apr. 5, 2011

(65) Prior Publication Data
US 2011/0243793 A1 Oct. 6, 2011

Related U.S. Application Data

(60) Provisional application No. 61/321,293, filed on Apr. 6, 2010.

(51) Int. Cl.
| | |
|---|---|
| *G01N 21/00* | (2006.01) |
| *H02P 21/06* | (2006.01) |
| *H02P 8/14* | (2006.01) |

(52) U.S. Cl.
CPC . *H02P 21/06* (2013.01); *H02P 8/14* (2013.01)

(58) Field of Classification Search
CPC .................................. H02P 21/06; H02P 8/14
USPC .......................................... 422/50, 67; 436/8
See application file for complete search history.

(56) References Cited

U.S. PATENT DOCUMENTS

| | | | |
|---|---|---|---|
| 4,223,558 A | | 9/1980 | Schmider et al. |
| 4,468,603 A | * | 8/1984 | Vander Meer et al. ....... 318/779 |
| 5,378,975 A | | 1/1995 | Scheid et al. |
| 7,308,322 B1 | * | 12/2007 | Discenzo et al. ............... 700/28 |
| 2003/0137272 A1 | | 7/2003 | Kuwano et al. |

FOREIGN PATENT DOCUMENTS

EP 0876219 11/1998

* cited by examiner

*Primary Examiner* — Dean Kwak
(74) *Attorney, Agent, or Firm* — Notaro, Michalos & Zaccaria P.C.

(57) ABSTRACT

The invention relates to a drive device (100) for use in a laboratory device, having a stepping motor (10) having rotor and stator, and having a motor controller (20), which is designed for the purpose of activating the stepping motor (10). In one embodiment, the drive device (100) comprises an encoder (11), which supplies a respective current encoder signal (e(t)) in operation (ia, ib), which reflects the current rotor position of the rotor, and phase terminals (14, 27), to tap the currently flowing motor phase currents (ia, ib). The motor controller (20) comprises a transformation module (13), in order to decompose the currently flowing motor phase currents (ia, ib) using a transformation method into a slip component (ix) and a torque component (iy). Furthermore, it comprises a slip regulation module (15), to which the slip component (ix) and a first target value (ix*) are supplied as input variables, and a torque regulation module (16), to which the torque component (iy) and a second target value (iy*) are supplied as input variables. The slip regulation module (15) and the torque regulation module (16) predefine the rotor phase currents (ia, ib) so that the difference between the slip component (ix) and the first target value (ix*) and the difference between the torque component (iy) and the second target value (iy*) are minimal.

16 Claims, 5 Drawing Sheets

DRIVE DEVICE FOR USE IN A LABORATORY DEVICE

CROSS REFERENCE TO RELATED APPLICATION

The present application claims priority on U.S. Provisional Patent Application No. 61/321,293 filed Apr. 6, 2010, which is incorporated here by reference.

The invention relates to a drive device for use in a laboratory device. In particular, it is directed to drive devices for liquid-handling laboratory devices, such as diluters and other liquid handling devices.

BACKGROUND OF THE INVENTION

Diluters are frequently used in the laboratory field when liquid quantities must be dispensed precisely. Diluters frequently comprise motor-driven syringe pumps, in which an actuator moves a piston of a syringe up and down precisely. An exemplary diluter is shown in FIG. 6. A three-way valve can be seated on the syringe, for example, which is also switched over via motor. The valve is preferably rotated so that a syringe chamber and a supply vessel having a reagent or diluent (e.g., a solvent, buffer, or similar medium) are fluidically connected. When the piston is pulled or moved down, the syringe is filled with diluent. The valve is then rotated so that the syringe chamber is fluidically connected to a dispenser tip. Diluent is delivered via the dispenser tip by the motorized raising of the piston. If the piston has reached the very top and the syringe is thus empty, the valve can be rotated in the direction of the supply vessel again and the syringe can be refilled.

In automated pipetting robots, so-called liquid handling devices, up to 16 diluters are used, for example, Freedom EVO® (Tecan Schweiz AG, 8708 Mannedorf, Switzerland) or Biomek® FX (Beckman Coulter, Inc., Fullerton, Calif.). In liquid handling devices, the diluters are used to generate an overpressure or partial vacuum via a line which leads to a pipette tip. The syringe and the line are therefore filled using system liquid. Deionized water is typically used as the system liquid. If the pipette tip is immersed in a sample liquid and a partial vacuum is generated at the pipette tip using movement of the syringe piston, a liquid sample is sucked into the syringe. If an overpressure is generated at the pipette tip via the syringe piston, the previously received liquid sample is delivered again. The diluters used in the liquid handling devices typically have a three-way valve. However, other valves can also be used. With the aid of the valve, fresh system liquid can be sucked in from a supply vessel via the syringes, in order to fill the line between diluter and pipette tip or to flush the line and to clean the pipette tips using system liquid.

During automatic pipetting, a sample is preferably delivered from the air without contact with the target vessel. The risk of sample carryover is thus minimized. In addition, the samples can be delivered more rapidly from the air than in contact with the target vessel or with a liquid already located in the target vessel. In the case of delivery of small volumes from the air, it is very important for the sample to be delivered at high speed and with a sharp stop at the end, in order to thus achieve a large negative acceleration. Otherwise, clean droplet ejection does not occur at the pipette tip. To be able to ensure these speeds having the sharp end stop at the pipette tip, it is important that the movement of the syringe piston is generated as precisely as possible and with high dynamic response, and is transmitted very directly to the pipette tip.

Water, preferably deionized water, in the pipette tip, line, and syringe, is used in liquid handling devices as a rigid movement mediator of the movement of the syringe piston to the pipette tip. The deionized water is considered an incompressible liquid and is therefore very well suitable as a movement mediator. However, if gas bubbles occur in the system liquid, e.g., due to the outgassing of air, every gas bubble acts as a small spring. Gas bubbles can form because of elevated temperatures of a motor in a diluter. The movement mediation from the syringe piston to the pipette tip is damped by such gas bubbles. Mechanical hysteresis effects in the diluter mechanism can also influence the system. This damping has a disadvantageous effect on the pipetting accuracy and correctness of the delivered volumes.

Motors, preferably stepping motors having corresponding motor controllers, are used in a liquid handling device. It has been shown that in the case of the conventional activation of a typical two-phase AC-operated stepping motor, high holding currents occur. These holding currents have the result that the entire diluter heats up. Temperatures of greater than 50° C. have been measured on freestanding diluters. If multiple such diluters are installed adjacent to one another in a liquid handling device, still higher temperatures can even occur, because the heat can only be dissipated poorly. The syringes, the valves, and sometimes the lines also heat up via the diluter housing. The system liquid is thus heated, which results in outgassing of air and therefore the above-mentioned undesirable bubble formation.

In addition, this heating of the motor and the surrounding components can result in a reduction of the lifetime (above all of the electronics and the plastic parts) of the liquid handling device, which is undesirable.

The object therefore results of providing diluters which generate minimal waste heat, do not unnecessarily heat up the system, and therefore do not display bubble formation in the system liquid. The object also results of optimizing other laboratory devices and in particular liquid handling devices. A particularly suitable drive device for this purpose is to be provided. In addition, a corresponding method for activating a motor is to be proposed.

These objects are achieved according to the invention by a device according to the claims. The features of a corresponding laboratory device having at least one drive device according to the invention can also be inferred be inferred.

Proceeding from the findings with respect to the origin of the mentioned temperature problems and the bubble formation in the system liquid in diluters and liquid handling devices, a novel drive device is proposed for use in a diluter, a liquid handling device, or another laboratory device.

According to the invention, the drive device comprises an AC-operated motor, preferably a two-phase AC-operated stepping motor, having rotor and stator, and a motor controller, which is designed to activate the motor dynamically with respect to speed and/or acceleration. The drive device according to the invention comprises means (e.g., a motor-side encoder), which deliver a current signal in operation, which reflects the current position of the rotor in the motor in relation to the stator or the poles. In addition, phase terminals in the form of shunt resistors are provided, for example, to be able to tap the currently flowing motor phase currents on the motor side. The motor controller according to the invention comprises a transformation module, in order to decompose the currently flowing motor phase currents into a slip component and a torque component using a transformation method. Furthermore, it comprises a slip regulation module, to which the slip component and a first target value (e.g., a zero value) are provided as input variables, as well as a torque regulation module, to which the torque component and a second target value are provided as the input variables. The slip regulation module and the torque regulation module regulate the rotor phase currents so that the difference between the slip component and the first target value and the difference between the torque component and the second target value are minimal at all times.

Such a configuration and wiring has the advantage that the motor which is used is always operated in the optimal range (i.e., greater efficiency and lower power consumption). The controllability of the motor is thus substantially improved and the dynamic response of the motor is increased. Dynamic response is understood above all as the capability for rapid acceleration and deceleration. The sharp deceleration is very important for contactless dispensing from the air, as explained at the beginning.

In addition, it is important in the handling of liquids and samples in laboratory devices to always know the precise location of the rotor of the motor. The invention allows a very precise check of the rotor position. Furthermore, it is important to know the precise position of the mechanical elements (for example, the pump piston) for the mentioned devices. This can also be achieved using the drive device according to the invention. In addition, the high dynamic response also plays a role for the pipetting result, as noted. For this purpose, the most rigid possible, undamped system is important, which does not display any spring action. The drive device according to the invention also offers advantages over typical devices in this regard.

Above all, at a standstill, current is only fed into the motor of the drive device when a force is required. Therefore, in a static case, no or only very low holding currents flow and hardly any heat is formed at the motor. Heating of the system liquid and therefore the outgassing of air are thus avoided. The drive device according to the invention is therefore particularly suitable as a drive device for a pump in a laboratory device and especially for a pump in a diluter or another laboratory device.

It is considered to be a further advantage of the invention that, due to the intelligent, demand-dependent feed of the motor, the power consumption is less than in previous devices or laboratory devices. The reduced power consumption has an influence on the ecology of the device or the laboratory device. In addition, applications can be implemented because of the low power consumption, which were not possible using previous approaches. For example, the invention can be used in portable applications, e.g., for environmental analysis or other field applications, which are fed from batteries or regenerative power sources.

The motors which are used here are synchronous motors which follow the externally applied field. Therefore, they can be operated without sensors for position feedback (encoder or rotary encoder). However, in some of the embodiments the invention nonetheless provides a motor-side encoder, to achieve good positioning accuracy, shorten the initialization method, and above all simplify the activation of the motor having the described advantages. In other embodiments which manage without an encoder, a motor is briefly operated in generator operation, in order to obtain information about the rotor position cyclically (e.g., every second current control cycle).

The invention has the advantage that a linear encoder or another decoder is not necessary to ascertain a linear movement of a mechanical component (e.g., a pump piston, tappet, a rotary spindle, or another mechanically movable element). The precise position is preferably accomplished according to the invention by an interaction of a motor-side angle encoder and a position regulation module, or by an interaction of a motor briefly operated in generator operation and a position regulation module.

In order to achieve an accuracy which is suitable for high-precision dosing in a diluter, for example, in which a motor controller according to the invention activates a (stepping) motor used as a pump motor, an encoder which has an angle resolution greater than 1024 lines per revolution can be used.

Depending on the embodiment and demand profile, an additional encoder can be placed on the moving mechanism, in order to also be able to compensate for the mechanical hysteresis, for example.

The use of linear encoders is superfluous, since the motor-side encoder or the motor in generator operation allows precise positioning specification with or without an additional encoder on the mechanism. Therefore, a drive device according to the invention can be integrated easily in greatly varying laboratory devices.

An activator of the motor typically has a processor which interacts with the motor. Only a control connection, for example, via a signal bus (e.g., RS-232, RS-485, or CAN) and a mechanical connection of the shaft or the axis of the (stepping) motor to the mechanical element of the laboratory device to be moved must be produced, in order to be able to address or activate the system (e.g., a processor).

It is a further advantage of the invention that the (stepping) motor is operated more efficiently than in the case of typical drive devices for laboratory devices.

The (stepping) motor has a significantly longer run time (in the meaning of service life or usage duration), since it is always operated at the optimum operating point using load-dependent current.

Through the increased dynamic response of the (stepping) motor using activation according to the invention, it is possible to dispense smaller volumes directly from the air. Liquid handling devices equipped with conventionally activated motors can deliver up to approximately 3 µl without contact from the air (diluter having 1000 µl syringe, pipette outlet 0.8 mm, and sharp stop), without additional units being required, which allow the drop ejection of the liquid sample by an impulse (see also patent application EP 876 219 of the applicant of the present application). Using the activation according to the invention, the contact-free delivery from the air of volumes up to 1 µl is possible without additional apparatus. The dynamic response of the (stepping) motor allows much steeper deceleration ramps than a conventional controller with identical hardware.

The precision and reproduction accuracy of the liquid delivery can be significantly increased by the precise motor regulation of the invention.

In the case of a conventional activator, extremely annoying noises can occur in specific speed ranges, for example, rattling when passing over the poles, which are intolerable in laboratory daily routine. Using the activation according to the invention, these annoying noises can be easily prevented or masked.

Further advantages result from the detailed description.

The device according to the invention, the laboratory device according to the invention, and the method according to the invention will be explained in detail on the basis of schematic drawings of exemplary embodiments, which do not restrict the scope of the invention.

Advantageous embodiments of the invention are described hereafter, these being exemplary embodiments. They comprise both various implementations of the overall invention, and also assemblies and individual parts of the invention. Fundamentally, the described assemblies and individual parts of the various embodiments may be combined with one another, or the assemblies and individual parts of individual embodiments may be replaced by the assemblies and individual parts of other embodiments, respectively. The combinations formed in this case can require small adaptations, which are trivial to a person skilled in the art and are therefore not described further, for example, to allow cooperation or interlocking of the assemblies and individual parts.

The term module is used here to indicate a functional group which is implemented in hardware, software, or as a combination of hardware and software. These modules preferably comprise one or more digital signal processors (DSP).

The motors which are used here are identified by the reference sign 10. Where a differentiation is made between motors with encoder 11 and motors without encoder 11, the first are identified by 10.1 and the second by 10.2. The motors 10.1 and 10.2 do not have to differ from one another technically, however, but rather the difference is primarily in the wiring and/or activation of the motors 10.1, 10.2.

Figure 1A:
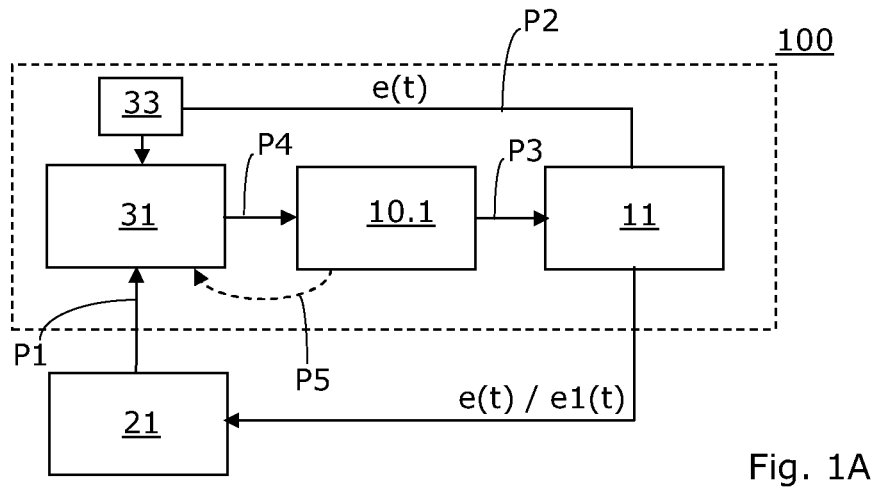
FIG. 1A shows a schematic block diagram of a first drive device of a laboratory device according to the invention.
Figure 1B:
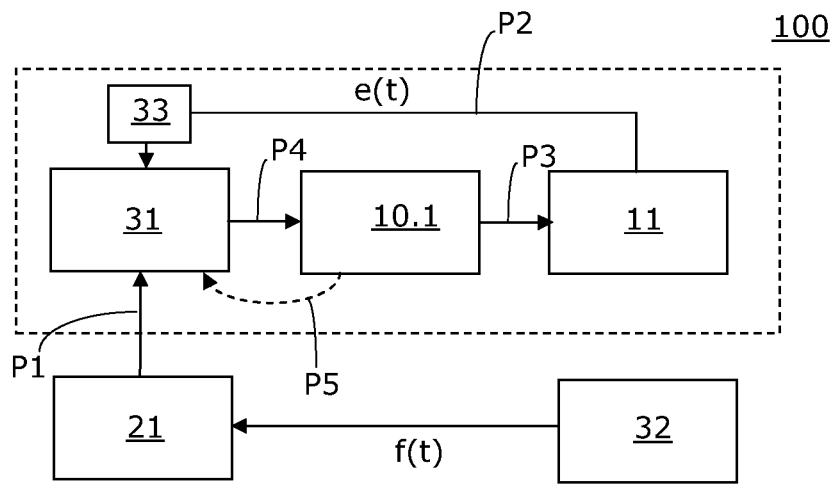
FIG. 1B shows a schematic block diagram of a second drive device of a laboratory device according to the invention.

Two fundamental embodiments of the invention with encoder are shown in schematic block diagrams in FIGS. 1A and 1B. Another fundamental embodiment of the invention without encoder (encoder-free embodiment) is shown in a schematic block diagram in FIG. 2. The function of the individual blocks or modules can also be allocated or combined differently, however, as shown in the figures.

Figure 2:
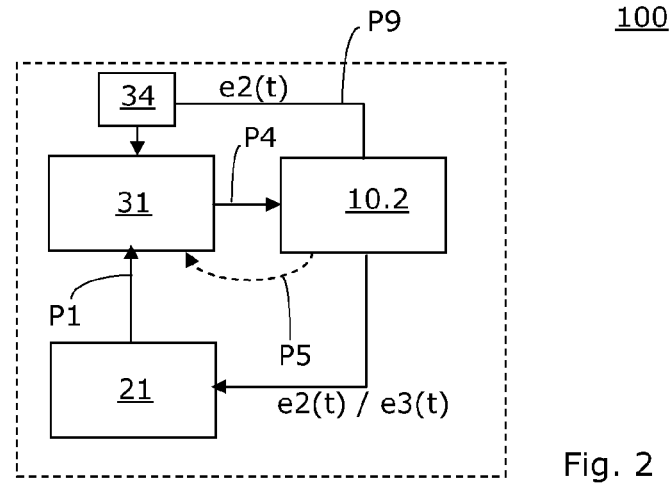
FIG. 2 shows a schematic block diagram of a further drive device of a laboratory device according to the invention.

Reference is made at various times to stepping motors 10 in connection with the present invention. The stepping motor 10 is a synchronous motor 10, in which the stator current is advanced from one set of stator coils to the next set of stator coils. The corresponding commutation is performed electronically in the case of the drive device 100 according to the invention by the use of a motor controller 20 having commutation module 31, as schematically shown in FIGS. 1A, 1B, and 2. The commutation can also be performed directly by a PID controller and/or other modules (this form of commutation is not shown in the figures). The magnetic attraction between rotor and stator teeth and the continuous commutation result in a rotational movement of the rotor.

In general, this activation can be applied with any type of synchronous motors 10. However, stepping motors 10 are preferably used in all embodiments here. Stepping motors 10 which have a step width less than 2° and preferably less than 1° are very particularly suitable. The smaller the step width, the better the controllability.

A stepping motor 10 is a motor whose rotor precisely follows the externally applied stator field. It can therefore also be operated without sensors for position feedback (encoder 11 or rotary encoder). Motors 10.2 which are briefly operable in generator operation to thus allow feedback about the rotor position, can also be operated without sensors for position feedback (encoder 11 or rotary encoder) by utilizing the back-EMF effect.

Figure 3:
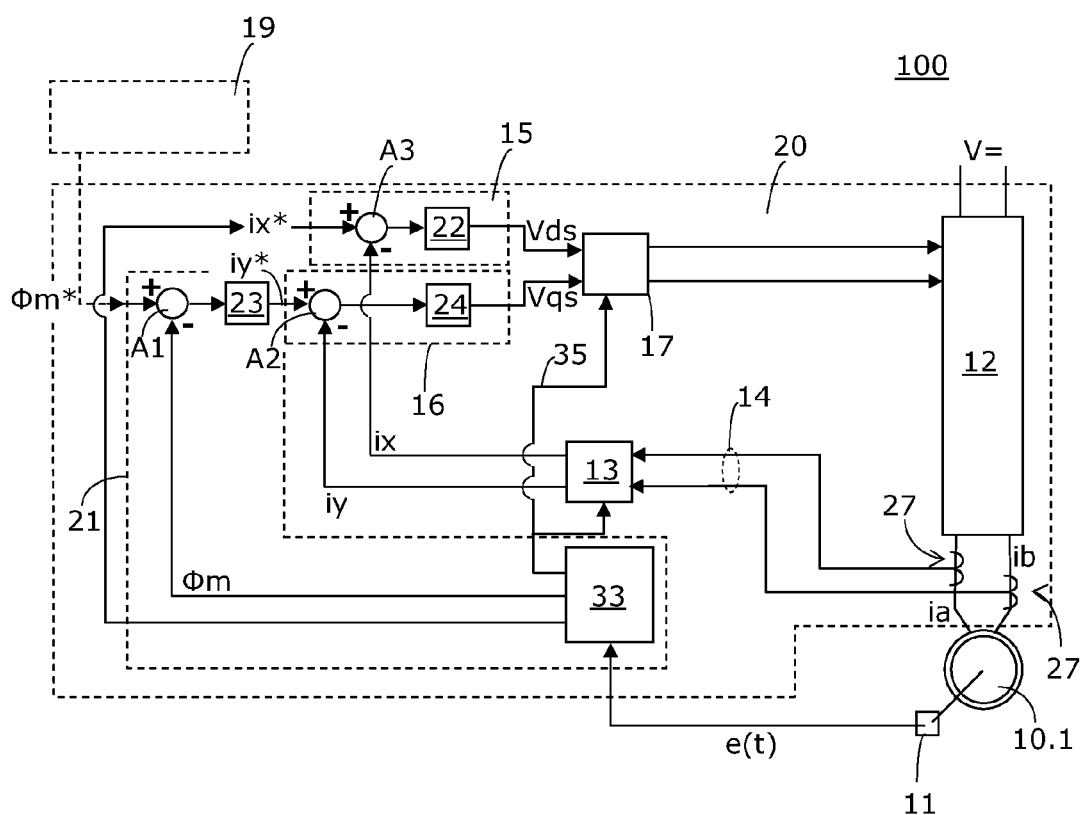
FIG. 3 shows details of a schematic block diagram of a further drive device of a laboratory device according to the invention.

According to the invention, in some of the embodiments, a motor 10.1 having motor-side encoder 11 is used, as shown in FIGS. 1A, 1B, and 3. This encoder 11 is seated directly on or adjacent to the motor 10.1 and supplies a signal, an encoder signal e(t) here, to the commutation module 31 (via an interconnected module for encoder signal processing 33 here). In addition, the encoder 11 can also transmit the encoder signal e(t) or a signal e1(t), which was derived from the encoder signal e(t) or ascertained therefrom, to a position regulation module 21, as shown in FIG. 1A. Alternatively, as shown in FIG. 1B, an additional (separate) encoder 32 is used, which is seated on or adjacent to a moving mechanical element (e.g., a mechanical element of a pump) of the drive device 100, for example. This encoder 32 supplies an encoder signal f(t) to the position regulation module 21. A combination of the two embodiments of FIGS. 1A and 1B is also conceivable, in which both the encoder 11 on the motor 10.1, and also a further encoder 32 transmit encoder signals e(t) or e1(t) and f(t) to the position regulation module 21.

However, the activation according to the invention may also be applied without encoder, in that the so-called back-EMF effect (also known as the electromotive counterforce or counter electromotive force) of a motor 10.2 is utilized. The corresponding embodiments do not require a motor-side encoder 11 to allow a statement about the rotor position, as indicated on the basis of the very schematic block diagram in FIG. 2. A motor 10.2 whose back-EMF is used is employed and activated by a commutation module 31 so that it primarily operates as a motor 10.2 and absorbs electrical power, to convert this power into mechanical movement (in the form of a rotation). However, the motor 10.2 is briefly operated as a freewheeling generator, which converts the rotation of the motor 10.2 into a voltage/current (referred to as generator signal e2(t) here). The embodiments of the invention which use an encoder-free motor 10.2 instead of a motor 10.1 having encoder 11 use the short-term generator operation of the motor 10.2 to allow a statement about the rotor position. The voltage (referred to as generator signal e2(t) here), which is tapped at the motor windings (on the rotor), while the motor 10.2 briefly continues to rotate in generator operation, is proportional to the angular velocity of the rotor. The rotor position in relation to the stator can be ascertained on the basis of the voltage curve. During the short-term generator operation, the rotor of the motor 10.2 continues to rotate at nearly unchanged angular velocity. During the motor operation, a current signal e2(t) is not available. The current signal e2(t) is only provided during the short-term generator operation, but can be tracked using a model which is modulated in software. The signal e2(t) or a signal e3(t), which is derived from the signal e2(t) or ascertained therefrom, can optionally also be supplied to a position regulation module 21. It contains the same information as the encoder signal.

The position regulation module 21 (see FIGS. 1A, 1B, 2, and 3) acts on the commutation module 31, as shown by the arrow P1. A connection P2 is used as feedback between the encoder 11 or the motor 10.2 and the commutation module 31. In the embodiment according to FIG. 2, a connection P9 is used as feedback. The tapping of the motor position by the motor-side encoder 11 is shown in FIGS. 1A, 1B, and 3 by the arrow P3. The commutative activation of the motor 10.1 is symbolized in FIGS. 1A, 1B, and 2 by the arrow P4.

In addition to the mentioned encoder signals e(t), e1(t), the commutation module 31 preferably also processes phase currents which are measured on the motor 10.1 or 10.2 or tapped via phase terminals 27, as shown in FIG. 3, for example.

Further details on the tapping of the phase currents and an embodiment having motor-side encoder 11 can be inferred from FIG. 3.

Precise positioning is brought about in some embodiments of the invention by interaction of the motor-side encoder 11 and the position regulation module 21, or the additional encoder 32 and the position regulation module 21, respectively. It is also possible, as noted, to have two encoders 11 and 32 interact jointly with the position regulation module 21.

According to the invention, two-phase AC-operated stepping motors 10 are preferably used in all embodiments, since these motors 10 can be operated at a slow speed (e.g., less than 400 RPM), since they generate high torques, have minimal wear, and are cost-effective above all.

Figure 4:
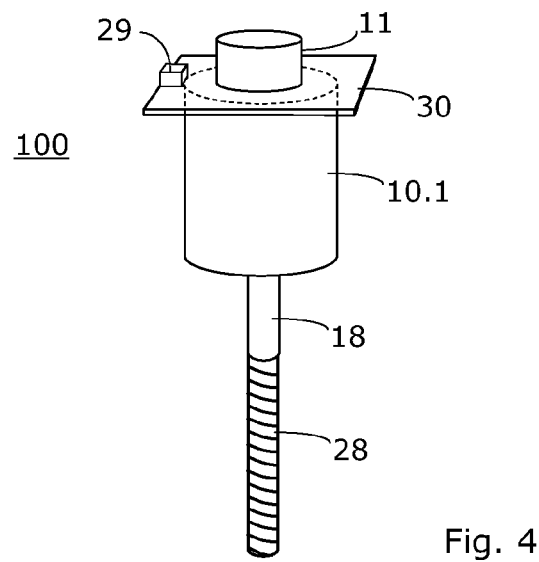
FIG. 4 shows a schematic perspective view of a drive device of a laboratory device according to the invention.

As shown on the basis of a schematic example in FIG. 4, the (stepping) motor 10 comprises a shaft (axis) 18, which is connected to a rotor mounted so it is rotatable. Since the stepping motor 10 with the motor controller 20 is primarily designed for use in a diluter 200 or another liquid-handling laboratory device (e.g., a liquid handling device), a mechanical element (e.g., a pump piston 202, a piston rod, a rotating spindle 28, a tappet, a gearwheel 208, a toothed roller or wheel 213) of a pump is connected to the shaft 18. Preferably, such pumps comprise a cylinder 216 having a piston 202 movable therein, as shown as an example in FIGS. 6 to 10. The axis or shaft 18 of the (stepping) motor 10 is mechanically connected to a movable mechanical element of the pump for the driving thereof.

The invention can also be used in connection with gearwheel pumps, screw pumps, diaphragm pumps, or peristaltic pumps. Further details on the possible pump configurations and constructions can be inferred from FIGS. 7 to 10.

According to the invention, the (stepping) motors 10 are operated in a closed control loop (closed loop), as described in greater detail hereafter. It is taken into consideration that in the case of a motor 10.1, the encoder information (e.g., the signal e(t)), or in the case of a motor 10.2, the generator signal e2(t), and the measured or tapped phase currents are used for the commutation of the motor 10.1 or 10.2. This commutation is performed, for example, by the commutation module 31.

The motor controller 20 for the commutation of the motor 10 comprises at least one PI or PID controller. A PI controller is a proportional-integral controller and a PID controller is a proportional-integral-derivative controller. The controllers 22, 23, 24 which are used according to the invention operate using a difference between an actual value and a target value. They attempt by regulating the motor controller 20 to minimize this difference or these differences or bring them entirely to zero.

The motor controller 20 preferably comprises three PI controllers or PID controllers 22, 23, 24, as shown in FIG. 3 on the basis of a special embodiment. These PI controllers or PID controllers 22, 23, 24 are elements of the corresponding slip regulation module 15, the corresponding position regulation module 21, and the corresponding torque regulation module 16.

The motor controller 20 of the invention is designed so that a rotary field is predefined using the stator coils in such a way that the rotary field follows the rotor of the (stepping) motor 10 with optimum slip. Small deviations from the ideal slip are immediately corrected by the slip regulation module 15 and the torque regulation module 16, which are responsible for the commutation together.

Further details of an embodiment of the device 100, which is especially designed for use in a laboratory device, are shown in above-mentioned FIG. 3. The device 100 comprises a two-phase AC-operated stepping motor 10.1 having rotor and stator here, as well as a motor controller 20, which is designed to efficiently activate the stepping motor 10. The device 100 further comprises a motor-side encoder 11, which supplies a current encoder signal e(t) in each case, which indicates the current rotor position of the rotor of the motor 10.1. In addition, phase terminals 27 and lines 14 are provided to be able to tap the currently flowing motor phase currents ia, ib on the motor side.

The motor controller 20 is distinguished in all embodiments in that it comprises a transformation module 13, to decompose the currently flowing motor phase currents ia, ib using a transformation method into a slip component ix and a torque component iy. Preferably, matrix transformation is used as the transformation method. Through the transformation, the current values of a first a-b coordinate system are mapped on a second x-y coordinate system. A slip regulation module 15 is used, to which the slip component ix and a so-called first target value ix* as a reference value are provided as input variables. Furthermore, the motor controller 20 comprises a torque regulation module 16, to which the torque component iy and a second target value iy* as a reference value are provided as input variables. The slip regulation module 15 and the torque regulation module 16 set the motor phase currents ia, ib in such a way that the difference between the slip component ix and the first target value ix* and the difference between the torque component iy and the second target value iy* are minimal or equal to zero at all times. Furthermore, a module 33 (module for encoder signal processing) is used here, which converts the electrical signals of the encoder 11 (in the concrete case 1024 lines, or 4096 increments per revolution) into an angle φm.

In FIG. 3, addition elements A1, A2, A3 are shown by circles and the respective sign applied is indicated by a plus sign or a minus sign directly adjacent to these addition elements A1, A2, A3. The addition element A1 subtracts the actual position φm from the target position φm*, i.e., the difference between the target position φm* and the actual position φm is observed. The addition element A2 subtracts the torque component iy from the second target value iy*, i.e., the difference between the second target value iy* and the torque component iy is observed. The addition element A3 subtracts the slip component ix from the first target value ix*, i.e., the difference between the first target value ix* and the slip component ix is observed.

A module 12 for pulse-width modulation can be used, as shown in FIG. 3, which is supplied with a DC voltage V= and modulates the motor phase currents ia, ib. The DC voltage V= can be 24 V, for example. The mentioned module 33 (module for encoder signal processing) can be used here to convert the electrical signals of the encoder 11 into an angle φm. In the case of an encoder-free motor 10.2, another module 34 (module for generator signal processing) can perform any conversion or preprocessing of the generator signal e2(t), as indicated in FIG. 2.

In all embodiments of the invention, the position regulation is particularly important, which is schematically illustrated by a position regulation module 21. The position regulation module 21 processes, depending on the embodiment, an encoder signal (e.g., e(t)) of a motor 10.1 or a generator signal e2(t) of a motor 10.2. A module for encoder signal processing 33 or a module for generator signal processing 34 is preferably interconnected, as shown in FIGS. 1A, 1B, 2, and 3.

The module for encoder signal processing 33 can be used as part of the motor controller 20, in order to derive a speed statement from the signal e(t) of the encoder 11. The speed statement results, for example, from the number of the angle increments, which the encoder 11 indicates, and the time. The speed statement can also be ascertained using an additional encoder 32 (see FIG. 1B, for example). The speed statement can be an angular velocity of the shaft or axis 18 of the stepping motor 10 or a linear velocity of a moving mechanical element (e.g., the pump piston 202) of a pump. This speed statement can additionally be supplied to the slip regulation module 15 and/or a higher-order controller of the laboratory device, as shown in FIG. 3 by the connection 35. This function block or this connection 35, respectively, is optional.

An optional profile generator 19 is used, which predefines the time-dependent target values φm* for the position controller. In the case of a speed controller instead of the position controller 23, it predefines time-dependent target values for the speed controller. The target value(s), which are each identified by a "*", can also be predefined by application software or an application (e.g., a laboratory device, such as a liquid handling device).

The encoder 11 is preferably an incremental encoder. The higher the resolution of the encoder 11, the more precisely can target positions φm* be approached and also held. To achieve an accuracy which is suitable for the high-precision handling of a liquid quantity in a diluter 200, for example, in which a motor controller 20 according to the invention activates a (stepping) motor 10.1 used as a pump motor, an encoder 11 which has an angle resolution greater than 1024 lines is used.

A Hall sensor is particularly suitable as an encoder 11, since such a Hall sensor can be placed in a contactless way on the rear side of a stepping motor 10.1, for example. A schematic example of a stepping motor 10.1 having a Hall sensor used as an encoder 11 is shown in FIG. 4. It may also be seen on the basis of this FIG. 4 that the shaft or axis 18 of the motor 10.1 (or a motor 10.2) can be mechanically connected to a coaxial rotary spindle 28. The rotary spindle 28 can move a piston 202 or another mechanical element of a pump, for example. In FIG. 4, it is further indicated that a card 30 or circuit board can be seated on the rear side of the motor 10.1 (or the motor 10.2) (this card 30 or circuit board on the rear side of the motor 10.1 or 10.2 is optional). A part or all components of the motor controller 20 can be situated on the card 30 or circuit board. The connection to a higher-order controller, e.g., of a laboratory device, can be performed via a plug or a plug connection 29, for example. The laboratory device can thus be connected with respect to control to the motor controller 20.

In order that the method of the invention can be applied, the mechanical rotational angle must be uniquely synchronized with the electrical field which is applied to the motor 10. This can be implemented using an initial, controlled movement. During the initialization movement, the encoder signal e(t) or the generator signal e2(t) is input and brought into relation with a control signal P4. The zero position can then be calculated on the basis of the relation.

According to the invention, the following method is used when activating the (stepping) motor 10.1 or 10.2.

First step: measuring or tapping the current motor phase currents ia, ib using phase terminals 27 or other means.

Figure 5A:
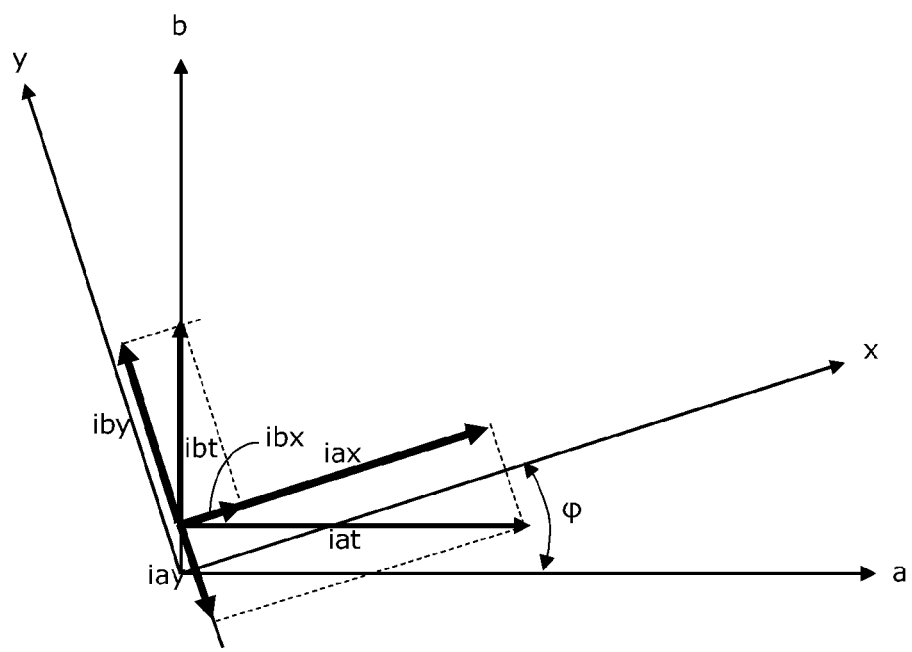
FIG. 5A shows a schematic view of a first step of the coordinate transformation according to the invention.

Second step: mapping or converting these motor phase currents ia, ib into a two-axis coordinate system having the axes a and b, as shown in FIG. 5A. The corresponding values iat and ibt represent time-variant values, which were derived from the motor phase currents ia, ib.

Figure 5B:
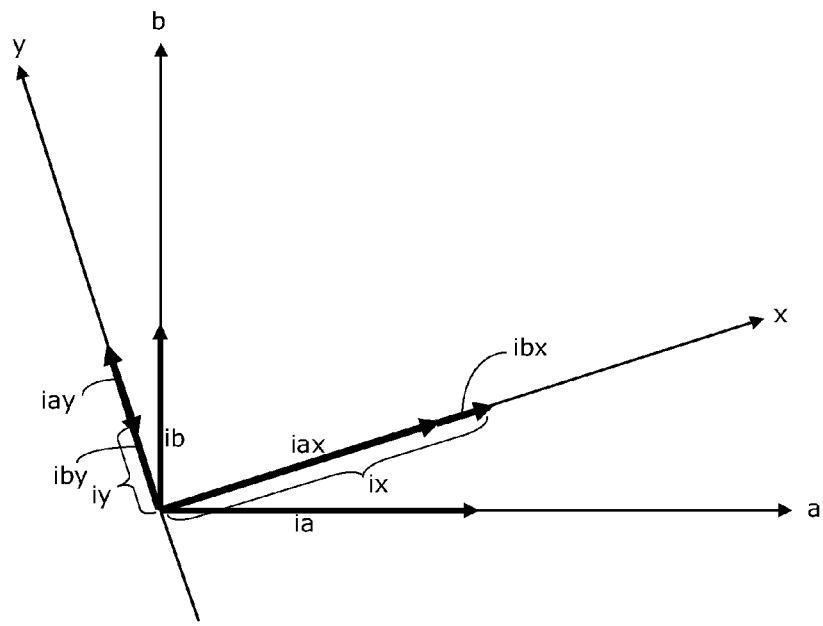
FIG. 5B shows a schematic view of a second step of the coordinate transformation according to the invention.

Third step: rotating the two-axis a-b coordinate system to adapt it to the current slip of the stepping motor 10. A transformation angle cp can be used for the rotation of the two-axis a-b coordinate system, which has been obtained during a last iteration of the motor controller 20. In this third step, the values iat and ibt are decomposed vectorially into coordinate components (vector components) of the x-y coordinate system newly obtained by rotation. The newly obtained x-y coordinate system is defined by the axes x and y, as shown in FIG. 5A. The vector iat in the a-b coordinate system is decomposed into a component iax on the x axis and a component iay on the y axis. The vector ibt in a-b coordinate system is decomposed into a component ibx on the x axis and a component iby on the y axis. FIG. 5B shows that the vector ix (=slip component) is composed in the y axial direction from the component iay+iby. The vector iy (=torque component) in the y axial direction, in contrast, is composed of the components iay+iby. The corresponding axes a and b, as well as x and y, are each perpendicular to one another and the vectors on the individual axes are therefore orthogonal to one another, i.e., they are independent of one another. Therefore, if needed the vector ix (=slip component), for example, can be forced to zero, for example, without influencing the current vector iy (=torque component).

This third step is referred to as a transformation or matrix transformation and is performed by the transformation module 13.

Fourth step: in this step, the corresponding differences (ix*−ix or iy*−iy) are calculated by the addition elements A3 or A2, respectively, as described. The difference ix*−ix controls or regulates the slip component and the difference iy*−iy controls or regulates the torque component. These differences (ix*−ix or iy*−iy) are transmitted as input variables to the controllers 22 or 24, respectively. The controllers 22 and 24 generate the corresponding voltage vectors Vds and Vqs. To be able to provide the corresponding voltage vectors Vds and Vqs, a transformation is again performed here. A so-called inverse matrix transformation is preferably used for this purpose, which provides a transfer of the vectors of the x-y coordinate system into an a-b coordinate system (in a reversal of the procedure of FIGS. 5A and 5B). This inverse matrix transformation is executed by an inverting transformer 17 (see FIG. 3).

Fifth step: these steps are now each repeated using new values. The higher the repetition rate, the more rapidly the control loop of the motor controller 20 operates. The motor controller 20 regulates the motor 10.1 or 10.2 in quasi-real-time. Ultrasmall deviations are recognized on the basis of the mentioned differentiation and immediately corrected (minimized).

Using the motor controller 20, the low-pass and magnetic flux properties of the (stepping) motor 10.1, 10.2 can be compensated for, in order to be able to predefine a speed-independent torque of the (stepping) motor 10.1, 10.2.

The drive device 100 can be used particularly advantageously in diluters 200, as shown in FIGS. 6 to 10, for example.

Figure 6:
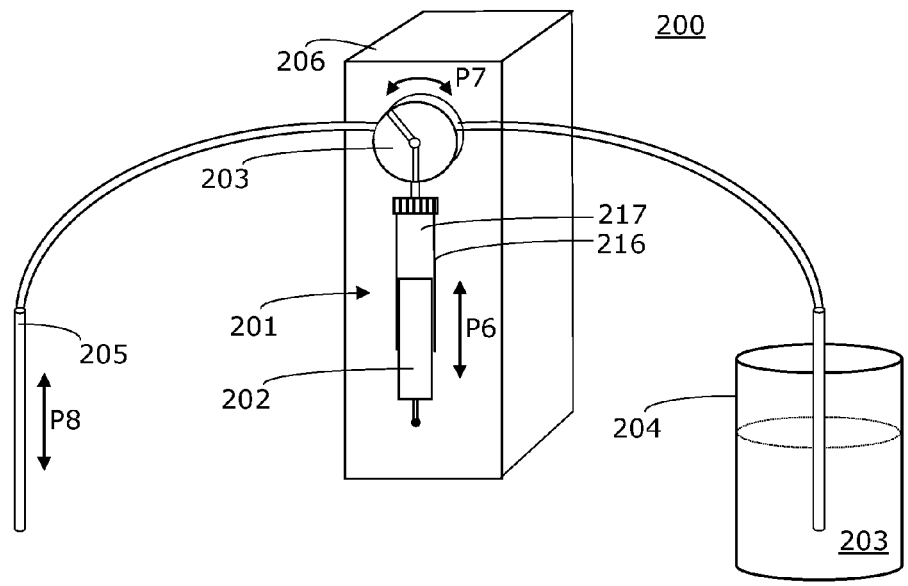
FIG. 6 shows a schematic perspective view of a pipetting robot having a diluter according to the invention.

A corresponding diluter 200 is shown in FIG. 6. The diluter 200 comprises a motor-driven syringe pump, in which a motor 10 (not shown in FIG. 6) moves a piston 202 of a syringe 201 up and down precisely in a cylinder 216. The up-and-down movement is identified by the double arrow P6. For example, a three-way valve 203 (or another valve) can be seated on the syringe 201, which is also changed over via motor by rotation, as shown by the double arrow P7. The valve 203 is preferably switched so that a syringe chamber 217 and a supply vessel 204 are fluidically connected to a reagent or diluent 203 (e.g., a solvent, buffer, or similar medium). When the piston 202 is pulled or moved down, the syringe 201 is filled with diluent 203. The valve 203 is then switched by rotation, so that the syringe chamber 217 is fluidically connected to a dispenser tip 205. Diluent medium 203 is delivered via the dispenser tip 205 by moving up the piston 202 via motor. If the piston 202 has reached the very top and the syringe 201 is thus empty, the valve 203 can be switched back in the direction of the supply vessel 204 and the syringe 201 can be refilled. The double arrow P8 indicates that the dispenser tip 205 can be automatically moved by a robot arm (not shown), for example.

The described up-and-down movement piece 6 of the piston 202 can be brought about by a motor 10, which is activated and regulated by a motor controller 20, as described. The motor 10 including motor controller 20 is preferably seated behind or in the interior of the housing 206 shown in FIG. 6.

Multiple examples of the construction of a diluter 200 with (stepping) motor 10 are shown in FIGS. 7 to 10.

Figure 7:
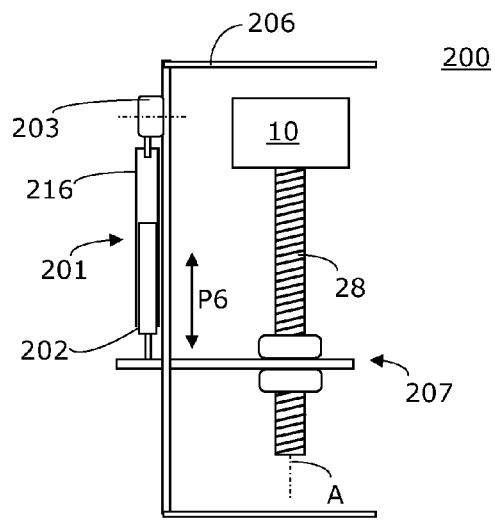
FIG. 7 shows a schematic side view of a first diluter according to the invention.

FIG. 7 shows a diluter 200 having a motor 10 installed at the rear, whose shaft or axis is designed as a rotary spindle 28. The rotary spindle 28 is seated in a carrier or armature 207. When the motor 10 rotates the rotary spindle 28 around its longitudinal axis A, the carrier or armature 207 is moved together with the pump piston 202 mechanically connected thereto. The up-and-down movement of the piston 202 is shown by the double arrow P6. The other elements of the diluter 200 were already described in connection with FIG. 6. Reference is therefore made to the description of this figure.

Figure 8:
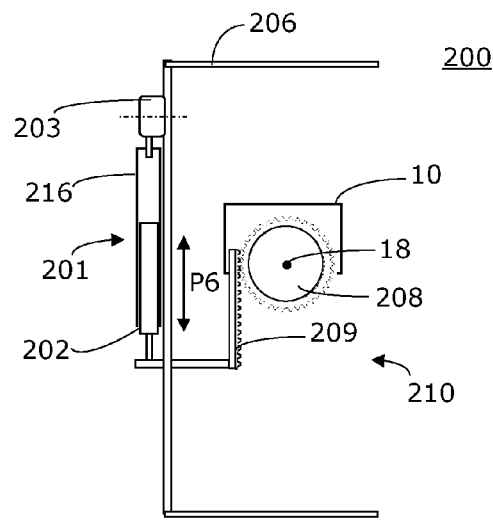
FIG. 8 shows a schematic side view of a second diluter according to the invention.

FIG. 8 shows a diluter 200 having a motor 10 installed at the rear, on whose shaft or axis 18 a gearwheel (a spur gear 208 here) is seated. The spur gear 208 engages in a toothed rack 209. When the motor 10 rotates the axis or shaft 18, the spur gear 208 also rotates. During a rotation of the spur gear 208 clockwise, the toothed rack 209 is moved upward together with the pump piston 202 connected thereto. During a rotation counterclockwise, a downward movement results. The up-and-down movement of the piston 202 is shown by the double arrow P6. In addition to the configuration shown, there are also other forms of so-called gearwheel drives 210 which can be used in a diluter 200.

Figure 9:
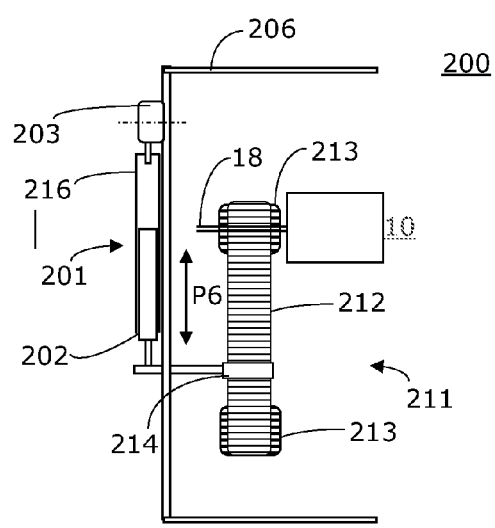
FIG. 9 shows a schematic side view of a third diluter according to the invention.

FIG. 9 shows a diluter 200 having a motor 10 installed at the rear having toothed belt drive 211. A toothed roller or a toothed wheel 213 is seated on the shaft or axis 18 of the motor 10. A second toothed roller or a second toothed wheel 213 is attached at a certain distance. A toothed belt 212 runs around the toothed rollers or wheels 213. When the motor 10 rotates the axis or shaft 18, the toothed belt 212 moves. A carrier 214, for example, which transmits the movement of the toothed belt 212 to the pump piston 202, is attached to the toothed belt 212. An up-and-down movement P6 thus again results.

In the various examples of FIGS. 7 to 9, step-up or step-down transmissions (e.g., via toothed belts or gearings) can additionally also be used.

Figure 10:
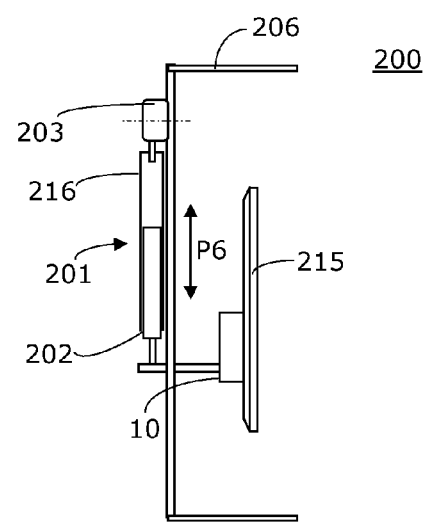
FIG. 10 shows a schematic side view of a fourth diluter according to the invention.

FIG. 10 shows a diluter 200 having a linear motor 10 installed at the rear, which comprises an oblong stator 215. A movement upward or downward results through suitable change of the fields between the linear motor 10 and the stator 215. This movement can be mechanically transmitted to the pump piston 202, as shown. An up-and-down movement P6 again thus results.

A pump which is driven using a drive device 100 has a high efficiency. The high-precision positioning using the position regulation module 21, the rigid undamped regulating system, and the other features of the invention allow outstanding handling of ultrasmall liquid quantities. In spite of this high accuracy during the handling of ultrasmall liquid volumes, such a pump can be operated at high speed and load-dependent output. The drive device 100 according to the invention can drive a pump at up to 6000 RPM, for example. Because of these properties, such a pump having drive device 100 can be used for manifold different laboratory applications in the corresponding laboratory devices.

Because of the negligible heat development, the drive device 100, or the diluters 200 having the corresponding drive devices 100, can be placed closely adjacent to one another, without thermal problems occurring. In particular, this relates to multichannel liquid handling devices having one diluter 200 per pipetting channel for receiving and delivering liquid samples. Each diluter 200 comprises a drive device 100 according to one of the embodiments in this case.

Because of the reduced power consumption, the drive device 100 is particularly also suitable for mobile uses and applications.

| Reference numerals: | |
| --- | --- |
| stepping motor/synchronous motor | 10 |
| encoder | 11 |
| pulse-width modulation module | 12 |
| transformation module (park transformer) | 13 |
| signal lines | 14 |
| slip regulation module | 15 |
| torque regulation module | 16 |
| inverting transformer | 17 |
| motor shaft or axis | 18 |
| profile generator | 19 |
| motor controller | 20 |
| position regulation module | 21 |
| PI or PID controller | 22 |
| PI or PID controller | 23 |
| PI or PID controller | 24 |
| phase terminals (shunts) | 27 |
| rotary spindle | 28 |
| plug or plug connection | 29 |
| card | 30 |
| commutation module | 31 |
| further encoder | 32 |
| module for encoder signal processing | 33 |
| module for generator signal processing | 34 |
| connection | 35 |
| drive device | 100 |
| diluter | 200 |
| syringe | 201 |
| piston | 202 |
| system liquid | 203 |
| supply vessel | 204 |
| dispenser tip | 205 |
| housing | 206 |
| carrier/armature | 207 |
| spur gear | 208 |
| toothed rack | 209 |
| gearwheel drive | 210 |
| toothed belt drive | 211 |
| toothed belt | 212 |
| toothed rollers or wheels | 213 |
| carrier | 214 |
| oblong stator | 215 |
| cylinder | 216 |
| syringe chamber | 217 |
| longitudinal axis | A |

-continued

| Reference numerals: | |
|---|---|
| axes, phase currents | a, b |
| addition elements | A1, A2, A3 |
| axes, torque and slip | y, x |
| (encoder) signal | e(t), f(t) |
| signal which was derived from an encoder signal | e1(t) |
| generator signal | e2(t) |
| signal which was derived from a generator signal | e3(t) |
| motor phase currents | ia, ib |
| time-variant values | iat, ibt |
| component | iax |
| component | ibx |
| component | iay |
| component | iby |
| slip component (vector) | ix |
| first target value, slip | ix* |
| torque component (vector) | iy |
| second target value, torque | iy* |
| transformation angle | φ |
| arrow | P1, P2, P3, P4, P5, P6, P7, P8, P9 |
| output signals (voltage vectors) | VAs, VBs |
| DC voltage | V= |
| target position | Φm* |
| actual position | Φm |

The invention claimed is:

1. A drive device being designed for a laboratory device, comprising
a motor with rotor and stator;
a position acquisition means;
a plurality of phase terminals; and
a motor controller, arranged for controlling the motor, comprising a transformation module, a slip regulation module connected to the position acquisition means, and a torque regulation module connected to the position acquisition means,
wherein the motor controller further comprises a non-transient computer readable medium programmed with a computer software to control one or more digital signal processes to:
direct the position acquisition means to supply a current signal which indicates the current rotational position of the rotor in relation to the stator and further supply a first target value and a second target value,
direct the phase terminals to tap multiple currently flowing motor phase currents on the motor side
direct the transformation module to decompose the currently flowing motor phase currents into a slip component and a torque component using a transformation method,
direct the slip regulation module and the torque regulation module to predefine rotor phase currents for commutation of the motor so that the difference between a slip component value and the first target value and the difference between a torque component value and the second target value are minimal,
wherein the slip component and the first target value are provided as input variables to the slip regulation module,
wherein the torque component and the second target value are provided as input variables to the torque regulation module.

2. The drive device according to claim 1, wherein an encoder acts as the position acquisition means, wherein the encoder is assigned to the motor, and wherein the current signal is an encoder signal.

3. The drive device according to claim 1, wherein the motor is an encoder-free stepping motor which is adapted for short-term power generation to thereby generate a current signal comprising information about the rotor position by utilizing the back-EMF effect of the motor.

4. The drive device according to claim 1, wherein the motor controller further comprises an inverting transformer configured to transform output signals of the slip regulation module and the torque regulation module into control variables, and a pulse-width modulation module configured for converting said control variables into the motor phase currents.

5. The drive device according to claim 1, wherein the transformation module comprises a matrix transformer.

6. The drive device according to claim 5, wherein the matrix transformer generates the slip component and the torque component from current values using a matrix transformation.

7. The drive device according to claim 1, wherein the motor controller modulates the motor phase currents being dependent on the difference between the slip component (ix) and the first target value and the difference between the torque component and the second target value respectively.

8. The drive device according to claim 1, wherein the motor controller regulates the motor phase currents to zero, if no external forces are applied to the motor.

9. The drive device according to claim 8, wherein the drive device is designed for installation in a diluter.

10. The drive device according to claim 1, wherein a position regulation module ascertains an actual rotor position on the basis of the current signal, and is further configured to set the torque of the motor so that the difference between the target position and the actual position is minimal.

11. The drive device according to claim 1, wherein the motor controller regulates the slip component and the torque component individually and independently of one another.

12. The drive device according to claim 1, wherein the motor controller compensates for low-pass and magnetic flux properties of the motor, in order to thus be able to predefine a speed-independent torque of the stepping motor.

13. The drive device according to claim 1, wherein the motor controller comprises an integrated circuit.

14. The drive device according to claim 1, wherein the motor controller is a pump controller and the motor is a pump motor.

15. The drive device according to claim 1, wherein the rotor of the motor is mechanically connected to a moving pump element of a laboratory device.

16. A laboratory device comprising at least one drive device according to claim 1,
wherein the at least one drive device of said laboratory device is connected to said motor controller, and
wherein the laboratory device is controlled by said motor controller.

* * * * *